Patented Sept. 25, 1934

1,974,554

UNITED STATES PATENT OFFICE 1,974,554

PROCESS FOR THE PRODUCTION OF AMINO ACIDS FROM SUBSTANCES CONTAINING KERATIN

Ernst Ziegler, Berlin-Wilmersdorf, Germany, assignor to Catharina Weidner, Charlottenburg, near Berlin, Germany No Drawing. Application April 24, 1933, Serial No. 667,616. In Germany May 6, 1932

10 Claims. (Cl. 260—119)

It is known that substances containing keratin, such as horn meal, nails, claws, hairs, feathers may be decomposed to amino acids by means of acid or alkaline hydrolysis. For this purpose generally strong acids are employed, such as hydrochloric acid of 25 to 37%, or also caustic potash or soda solutions of a percentage of from 20 to 25%. Whereas the acid hydrolysis is a more gentle form of disintegration in regard to the preparation of decomposition products, the alkaline solutions, particularly when employed in a boiling state, effect a very far going or strong decomposition. In these processes, however, the elimination of the acids and alkalis employed is a matter of particular difficulty. In the employment of caustic potash or soda solution, the separation of the products of decomposition, chiefly amino acids, is almost impossible, owing to the extraordinary solubility in water of their sodium or potassium salts.

The solutions of alkaline earths, barium oxide, strontium oxide and calcium oxide or their hydroxides show a different behaviour when employed as hydrolytic disintegrating media. Whereas barium hydroxide solution has been employed under pressure at 150° C. no use has been made of calcium oxide or calcium hydroxide solution, as the difficulty of dissolving calcium oxide in water makes its utilization for this purpose impossible.

A process has also become known, according to which native albuminoid substances, such as egg albumin, are decomposed by means of calcium hydroxide or other hydroxides of alkaline earths. In this case, however, it is of importance that the decomposition of the albumin takes place at a moderate temperature, i. e. below 100° C., protalbinic acid thus being formed.

It has now been found, that boiling strontium hydroxide lye, the strength of which depends upon the quantity of the keratin containing substances and the like which are to be treated (on 5 kg. of material to be decomposed, for instance, 1 kg. of hydoxide was employed), furnishes totally different results in regard to yield than the use of corresponding quantities of barium hydroxide solution under the same conditions. Whereas when using barium hydroxide solution, a nondissolved residue of fully 40% was left after 10 hours of boiling with reflux, in the treatment with strontium hydroxide solution under the same conditions and for the same duration of boiling there remained only a residue of 15 to 17%. In employing barium hydroxide solution, therefore, only 60% of the treated keratin substances were decomposed, whereas when using strontium hydroxide solution to 83 to 85% of decomposition products could be obtained.

If the boiling is continued yet for a longer period with barium hydroxide solution, the decomposition of the keratin substances goes too far, so that the solutions thus obtained for instance do not contain tryptophane at all and tyrosine and cystine in minute quantities only. Also when performing the heating process under increased pressure the decomposition by means of strontium hydroxide remains by far more cautions than that executed by means of barium hydroxide not only with respect to the output in valuable products, but also with respect to the quality of the amino acids obtained, special importance being attached to the high output in cystine, tyrosine and tryptophane.

In view of the fact that the different keratin substances possess a different power of resistance against strontium hydroxide solution, it has proved to be suitable, to adapt the process of decomposition in accordance therewith. For instance it will be advisable to first heat in the strontium hydroxide solution those keratins which are difficultly attacked, and only afterwards during the decomposition process to add those other keratin substances which are more easily decomposed. In this way a mixture of most important amino acids is obtained, containing especially a very high percentage of tryptophane. According to the purpose to be attained the keratins may also be decomposed separately.

Although the residues are smaller when employing alkalis, such as caustic soda or caustic potash, it will be seen in this case, that the desired decomposition products are attacked further, just as in the case of the previously mentioned intensified application of barium hydroxide solution, the value of the obtained products thus being considerably diminished. For instance, the tryptophane which, as is known, is important from a biological point of view for the formation of cells will be destroyed during the decomposition process by means of caustic potash or caustic soda.

Moreover the use of barium hydroxide is unsuitable not only with respect to the bad output of valuable products obtained but also with respect to its toxic properties.

The elimination of the strontium may be effected in a simple manner by means of the usual precipitation, for instance by means of carbonic salts, such as sodium carbonate, potassium carbonate or ammonium carbonate. For the purpose of further carrying through the process it is of special importance that the solutions of sodium or potassium hydroxide or of ammonia which are formed during this reaction and which on a prolonged contact with the produced amino acids would effect in an undesirable manner a further decomposition of the latter, are neutralized by means of such acids which yield alkaline reacting transformation products with said lyes. Particularly adapted for this purpose are the boric acid and the phosphoric acid. If these acids are employed for the neutralization of the alkaline solutions, the solutions thus obtained will not contain free alkali, but only dissociated alkali in the form of borax, sodium phosphate, ammonium phosphate or the like, said dissolved substances owing to their weak alkaline properties, maintaining the present amino acids in solution, without attacking them, i. e. without being capable of decomposing them further. The solutions thus obtained after filtration may be further worked up independently or, if necessary, evaporated in vacuum.

The mixtures of amino acids thus obtained are principally intended for application to cosmetic purposes.

The use of strontium oxide or strontium hydroxide as hydrolytic dissociation means for keratins in connection with the neutralization of the sodium or potassium hydroxide or of the ammonia produced during the process brings about a by far better result than that obtained by processes known till now.

Examples (1) 20 parts of purified and dried hair material, 150 parts of water and 8.8 parts of crystallized strontium hydroxide are boiled together with reflux for a period of 5 hours. After terminating the boiling process the hydrogen sulphide formed in the solution is eliminated by addition of hydrogen peroxide or the like. The solution then is boiled and 4.8 parts of potassium carbonate of 96% purity are added meanwhile, the strontium thereby being precipitated in the form of its carbonate which, after settling, may be removed by filtration and washed. The filtrate thus obtained is then neutralized accurately, preferably by means of boric acid or phosphoric acid, in order to bind the potassium hydroxide produced in the solution. The solutions obtained in this manner may then be diluted or concentrated as desired and used in this form.

(2) 20 parts of purified and dried hair material are heated up to boiling point together with 200 parts of water and 8.8 parts of crystallized strontium hydroxide for a period of 3 hours under pressure of 1½ to 2 atmospheres in an autoclave. The further treatment corresponds with that described in Example 1.

Having now particularly described and ascertained the nature of my said invention, I declare that what I claim is:—

1. Process for the production of amino acids from substances containing keratin, consisting in heating these substances with alkaline strontium compounds and water to temperatures of at least 100° C.

2. Process for the production of amino acids from substances containing keratin, consisting in heating these substances with strontium oxide and water to temperatures above 100° C.

3. Process for the production of amino acids from substances containing keratin, consisting in heating these substances with strontium hydroxide and water to boiling point.

4. Process for the production of amino acids from substances containing keratin, consisting in heating these substances with alkaline strontium compounds and water and thereafter precipitating the strontium by alkaline salts of such acids the acid radical of which will form insoluble salts with strontium.

5. Process for the production of amino acids from substances containing keratin, consisting in heating these substances with alkaline strontium compounds and water and thereafter precipitating the strontium by alkaline salts of such acids the acid radical of which will form insoluble salts with strontium, a weak inorganic acid then being added in such a quantity that the free alkali contained in the solution will be bound.

6. Process for the production of amino acids from substances containing keratin, consisting in heating these substances with alkaline strontium compounds and water and thereafter precipitating the strontium by an alkali metal carbonate.

7. Process for the production of amino acids from substances containing keratin, consisting in heating these substances with alkaline strontium compounds and water and thereafter precipitating the strontium by ammonium carbonate.

8. Process for the production of amino acids from substances containing keratin, consisting in heating these substances with alkaline strontium compounds and water and thereafter precipitating the strontium by an alkali metal carbonate, boric acid then being added in such a quantity that the free alkali contained in the solution will be bound.

9. Process for the production of amino acids from substances containing keratin, consisting in heating these substances with alkaline strontium compounds and water and thereafter precipitating the strontium by an alkali metal carbonate, phosphoric acid then being added in such a quantity that the free alkali contained in the solution will be bound.

10. Process for the production of amino acids from substances containing keratin, consisting in heating these substances with alkaline strontium compounds and water to temperatures of at least 100° C. under increased superatmospheric pressure.

ERNST ZIEGLER.